United States Patent [19]

Montagu

[11] Patent Number: 5,235,180
[45] Date of Patent: Aug. 10, 1993

[54] ROTARY MOTOR HAVING AN ANGULAR POSITION TRANSDUCER AND GALVANOMETER SCANNING SYSTEM EMPLOYING SUCH MOTOR

[75] Inventor: Jean I. Montagu, Brookline, Mass.

[73] Assignee: General Scanning, Inc., Watertown, Mass.

[21] Appl. No.: 847,774

[22] Filed: Mar. 5, 1992

[51] Int. Cl.⁵ ............................................. G01D 5/34
[52] U.S. Cl. .......................... 250/231.13; 250/231.14
[58] Field of Search ..................... 250/231.13, 231.14, 250/237 G, 548, 203.7; 356/369, 353, 375; 324/175

[56] References Cited

U.S. PATENT DOCUMENTS

| | | | |
|---|---|---|---|
| 2,534,505 | 12/1950 | Ergen | 318/25 |
| 3,970,979 | 7/1976 | Montagu | 335/229 |
| 4,142,144 | 2/1979 | Rohr | 324/6 R |
| 4,286,760 | 9/1981 | Couderc et al. | 250/203.7 |
| 4,528,448 | 7/1985 | Doggett | 250/231.14 |
| 4,587,513 | 5/1986 | Burrowes et al. | 250/231.13 |
| 4,694,235 | 9/1987 | Flowers | 318/662 |
| 4,806,751 | 2/1989 | Abe et al. | 250/231.13 |
| 5,099,386 | 3/1992 | Stokes et al. | 361/298 |

OTHER PUBLICATIONS

Silicon Detector Corporation commercial literature; Jun. 1992 (no pages).

Primary Examiner—David C. Nelms
Assistant Examiner—Que T. Le
Attorney, Agent, or Firm—Fish & Richardson

[57] ABSTRACT

An analog optical position transducer for detecting angular position of a rotatable member of a motor. The transducer includes a plurality of sensing surfaces placed in one frame of reference and a modulator located in another frame of reference, one of the frames of reference being stationary and the other moving with the rotatable member. The relative angular position of the two frames of reference is determined from the amount of light varied by the modulator and detected by the sensing surfaces. The modulator employs a radiation source which is located on a diffusive surface or which irradiates the diffusive surface of the modulator. Radiation emitted from the diffusive surface is modulated by the modulator depending on the relative position of the modulator and the sensing surfaces. A lens focuses the emitted radiation onto the sensing surfaces. The sensing surfaces are symmetrically arranged about an axis passing through the center of rotation of the rotor, and their relative distribution with respect to the surfaces of the modulator enables differential detection. An analog circuit connected to the sensing surfaces continuously determines the angular position of the rotatable member from the amount of light detected at each of the sensing surfaces. The system is effective to accurately position a mirror in a high speed laser scanner.

22 Claims, 8 Drawing Sheets

ROTARY MOTOR HAVING AN ANGULAR POSITION TRANSDUCER AND GALVANOMETER SCANNING SYSTEM EMPLOYING SUCH MOTOR

BACKGROUND OF THE INVENTION

This space invention relates to position transducing.

In many applications it is important to measure and to control the angular position of a rotary element with high accuracy. For instance, galvanometers require sensors which must detect the angular position of the rotor with extreme accuracy and repeatability, high temperature stability, and high signal to noise ratio. To enable higher speed of operation, in addition, these sensors must be small in size and have low inertia. To meet the requirement of very accurate detection at low cost has, in the past, required undesirable compromises.

In the field of galvanometers the precision requirements for the angular position detection may be one part in one thousand or even one part in one million, depending upon the application. Detection at this accuracy has, for example, been achieved using variable-inductance transducers or variable-capacitance transducers. The variable-inductance transducers utilize changes in the mutual inductance dependent on the angular position of the rotor. The variable-capacitance transducers employ changes in capacitance caused by the angular motion of the rotor. Usually, a stationary portion of the variable-capacitance transducer is formed by a pair of capacitor plates, held as one frame of reference, and a moving portion is a rotating dielectric located between the capacitor plates, which is held as another frame of reference. Both types of transducers are used in a closed-loop system or in an open-loop system. A closed-looped system is designed to precisely position rotatable elements since it can compensate for errors due to external forces or nonlinearities. When this system is calibrated these errors are measured and a position feedback mechanism is used to improve the accuracy of the device. If a system alternatively uses an open-loop arrangement, such system can perform the above mentioned corrections and can also report the orientation of the rotor. The present transducer replaces the variable inductance transducer or the variable-capacitance transducer in such systems.

Angular position transducers are used not only to detect the angular position of the rotatable element but also to control and hold the rotatable element in a desired position. For example, a galvanometer can be used to drive a mirror. The mirror is used to deflect a laser beam which in turn modifies material or objects as in microlithography, reprographic applications, exposure of photosensitive films or papers, micromachining, laser trimming of film resistors, or repairing of memory circuits, for entertainment or metrology such as laser scanning microscopes. The present invention is also useful in these cases.

SUMMARY OF THE INVENTION

The transducer of the invention uses radiation transfer for determining the angular position of the rotatable element. Radiation emitted from a source is modulated by a modulator driven by the rotatable element and detected by a detector with a plurality of sensing elements. The amount of detected radiation thus varies with the position of the rotatable element. The transducer preferably uses light from a low cost LED but in broadest principle it can use radiation of wavelengths ranging from x-ray to infrared. The transducer has two frames of reference, a stationary frame of reference which contains the detector and a moving frame of reference which contains the modulator. The modulator preferably reflects radiation, or it can emit radiation, in such a way that the amount of radiation reaching the detector is dependent on the relative angular position of the two frames of reference. The modulator, located in the moving frame, can reflect or re-emit radiation from a source located in the stationary frame of reference, or it can have different arrangements; it can itself comprise a source of radiation, e.g., an electroluminescent lamp or a radioactive material can be imbedded in parts of a modulating surface of the modulator.

In another arrangement the stationary frame will contain the modulator and the moving frame will then contain the detector.

In one aspect, the invention provides a rotary motor having an angular position detector comprised of a driven member fixed to the rotor and a cooperating axially aligned stationary member, one of the members has a plurality of photosensitive sensing surfaces arranged to provide an angular position signal and the other has a radiation modulator with surface opposed to the photosensitive sensing surfaces. The radiation modulator is arranged to overlap the sensing surfaces in amounts directly dependent upon the angular position of the rotor; the modulator is arranged to control the amount of radiation energy that reaches the sensing surfaces in direct dependence with the relative angular position of the two members. The amount of energy detected by the sensing surface determines the value of the angular position signal. The modulator has an opaque surface and an emitting radiation diffusive surface. These surfaces are shaped and arranged relative to the sensing surface so that the amount of radiation from the modulator reaching the sensing surface is varied in direct dependence with the angular position of the rotor.

In another aspect of the invention the modulator is an illuminated diffusive surface shaped and arranged relative to the sensing surface so that the amount of radiation from the diffusive surface reaching the sensing surface varies in direct dependence with the angular position of the rotor. Furthermore, an optical source which illuminates the diffusive surface can be part of the modulator.

In another aspect of the invention the sensing surface has at least two sensitive sectors and the surface of the modulator is shaped and arranged to inversely vary the amount of radiation reaching the respective sectors with change in angular position of the rotor; the sensitive sectors are connected to a detection circuit that produces said angular position signal.

In another aspect of the invention, the sensing surface has four sensitive sectors symmetrically arranged relative to an axis passing through the center of rotation of the rotor, and the surface of the modulator is formed symmetrically relative to the axis; the form of the modulator surface enabling radiation reaching axially opposite pairs of the sensitive sectors to be affected in the same manner with change in angular position of the rotor.

In another aspect of the invention, the sensor surface is stationary and the modulator has a driven diffusive surface directed toward the sensing surface, and a stationary radiation source that is arranged to illuminate the diffusive surface; the driven diffusive surface is shaped to vary the amount of its radiation that reaches the sensing surface in direct dependence with the angular position of the rotor.

In another aspect of the invention, the sensor surface is stationary and the modulator has a driven opaque surface that is positioned between the sensor surface and a diffusive surface in a way that radiation from the diffusive surface travelling toward the sensing surface is modulated by the opaque surface; the driven opaque surface is shaped to vary the amount of radiation that reaches the sensing surface in direct dependence with the angular position of the rotor. Furthermore, an optical source illuminates the modulator which either reflects or re-emits radiation. A lens can be added to focus the radiation onto the sensor surface. In preferred embodiments, the modulator has the opaque surface mounted on and rotating with the diffusive surface which reflects radiation emitted from a stationary radiation source which consists of one or more light emitting diodes.

In another aspect of the invention, the sensing surface has two sensitive sectors, the sensitive sectors are connected to a detection circuit that produces the angular position signal by instantaneously evaluating the intensity of radiation detected at the sectors using the formula $\theta = (A-B)/(A+B)$ wherein A is the intensity of radiation detected at the first sector and B is the intensity of radiation detected at the second sector.

In the preferred embodiments the sensing surface has four sensitive sectors which are connected to a detection circuit that produces the angular position signal by instantaneously evaluating the intensity of the radiation detected at the sectors using the formula $\theta = (A+C-B-D)/(A+B+C+D)$ wherein A, B, C, and D are the intensities of light detected at the first, second, third, and fourth sector of the sensor surface respectively.

In another aspect of the invention, the angular position transducer is connected to a limited rotation galvanometer of a laser scanning system having an oscillating mirror for deflecting a laser beam; the angular position transducer is connected in a manner to maintain the accuracy of displacement of the rotor of the galvanometer.

DESCRIPTION OF THE PREFERRED EMBODIMENT

We first briefly describe the drawings.

DRAWINGS

STRUCTURE AND OPERATION

Figure 1A:
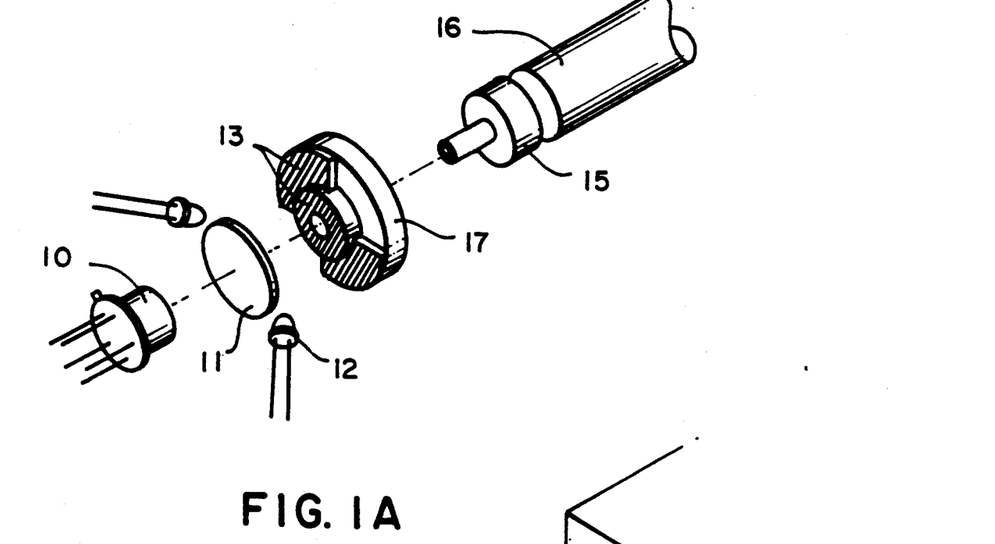
FIGS. 1A, 1B, 1C, 1D, 1E, and 1F are schematic drawings of different embodiments of the optical position transducer according to the invention.
Figure 2:
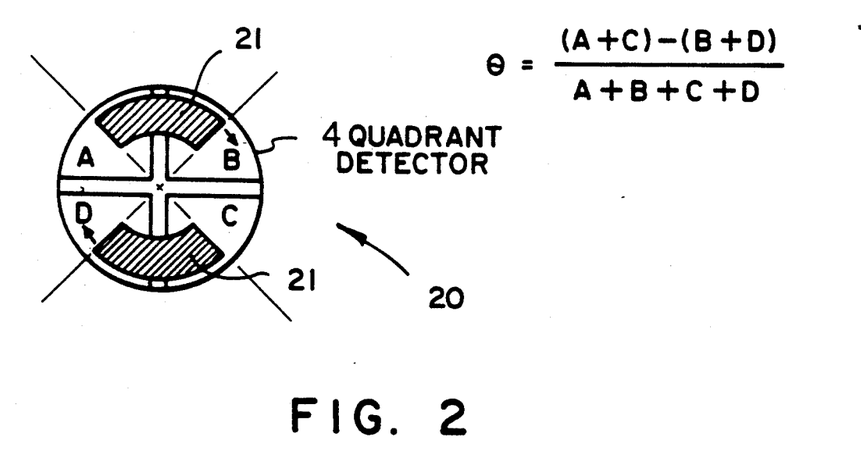
FIG. 2 is a schematic view of a sensing surface of an optical sensor employed.

FIGS. 1A and 2 schematically show the angular position transducer. Four stationary light emitting diodes 12 (only two are shown in FIG. 1A) illuminate diffusive surface 17 of the rotatable modulator. Light, reflected from the diffusive surface, is focused by stationary lens 11 onto sensing surface 20 of stationary quad detector 10. Four sensing surfaces 20 of the quad detector 10 shown in FIG. 2 receive light modulated by opaque surfaces 21 of the modulator. The opaque surfaces are shaped (here leaving butter-fly shaped diffusive surfaces exposed) to vary the amount of light reaching each sector dependently with the rotary position of the modulator.

Figure 3:
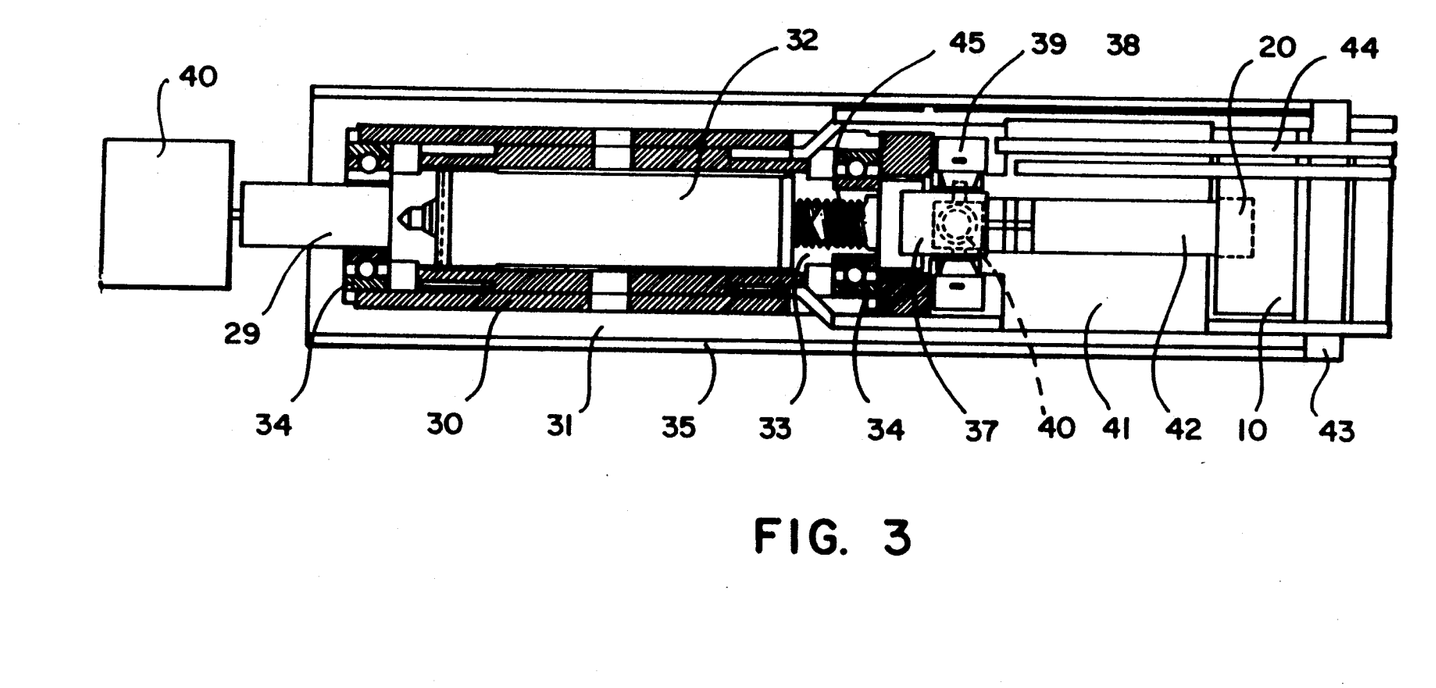
FIG. 3 is a cross-sectional view of a motor with an optical transducer according to the invention.

The preferred embodiment of FIG. 3 incorporates the position sensor schematically shown in FIGS. 1A and 2. A limited rotation motor (galvanometer) having a stator 31 that includes an outer shell, a heat sink and a coil, and having a permanent magnet rotor 32 that is mounted between shafts 29 and 33, causes the shaft to rotate. The shafts 29 and 33 are suspended by conventional ball bearings 34 which enable the shafts 29 and 33 to be mounted within a magnetically permeable shell 30. The shaft 29 is fixedly connected to a mirror 40. The magnetically permeable housing 30 surrounds the motor stator 31 and the rotor 32. The housing 35 is made of highly thermally conductive material such as aluminum in order to ensure that the motor can be properly cooled. This housing also surrounds the transducer. Inside of the aluminum heat sink there are stationary guides defining radial and axial registrations. They are omitted for clarity.

Referring to FIG. 3, four light emitting diodes LED 39 are mounted in slots 40 on one end of a holder 41 disposed within a stationary guide while the quad cell detector 10 is mounted on the other end of the holder 41. Thus the source holder 41 and the quad cell detector 10 provide the stationary frame of reference. When the shaft 33 rotates, the relative position of the diffuser 37 and the opaque target 38 thereon changes with respect to the sensing surfaces 20 of the quad detector 10, see FIG. 2. These position changes cause change in the amount of light detected at each sector of the sensing surface 20. A GRIN lens 42 focuses light coming from the diffuser 37 onto the sensing surface 20. A PCB 43 is attached to the back of the transducer and leads 44 which connect LEDs 39 and detector 10. The four light emitting diodes attached to the source holder 39 may for instance be LED HP Model No. HLMP P150 available from Hewlett Packard.

Figure 1B:
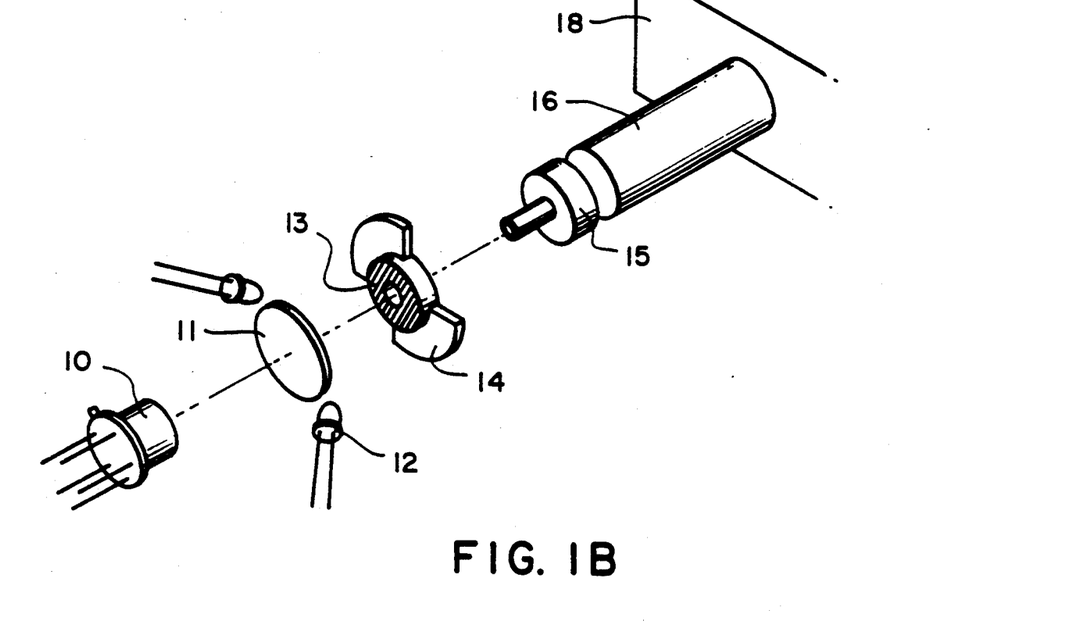

Several alternative schematic arrangements of the optical position transducer are shown in FIGS. 1A through 1F. Referring to FIG. 1B, light emitting diodes (LEDs) 12 illuminate the butter-fly shaped diffusive surface 14, Light, reflected from the diffusive surface 14, is focused by a lens 11 on to quad detector 10. The center part of the modulator has a non-reflective, opaque surface 13. The modulator comprised of surfaces 13 and 14 is mounted on a rotor 16 which extends from motor 18. Here again as the modulator rotates, it reflects light depending on its angular position, and the light is detected on a sensing surface 20, shown in FIG. 2.

In preferred embodiments, as shown in FIG. 2, the sensing surface 20 of the quad detector 10 is divided into four sectors called A, B, C, and D. FIG. 2 also shows an images 21 which represents light reflected by the diffusive or emissive surface 14, 18, 19, 17, or 37. Because of the butterfly shape previously mentioned, the diffusive surface varies in the same manner the amount of radiation detected at axially opposite sector pairs of the surface 20 in the same manner. As the diffuser 37 and the target 38 rotate, the intensity of light detected by the sectors B and D increases and the intensity of light detected by sectors A and C decreases and vice versa. Each sensing sector detects light and outputs voltage proportional to the intensity of detected light. The four output voltages determine the angular position of the rotor. A detector circuit, schematically shown in FIG. 7, produces an output voltage representative of the difference between the intensities detected by the two pairs of the axially opposite sensing sectors.

Figure 4:
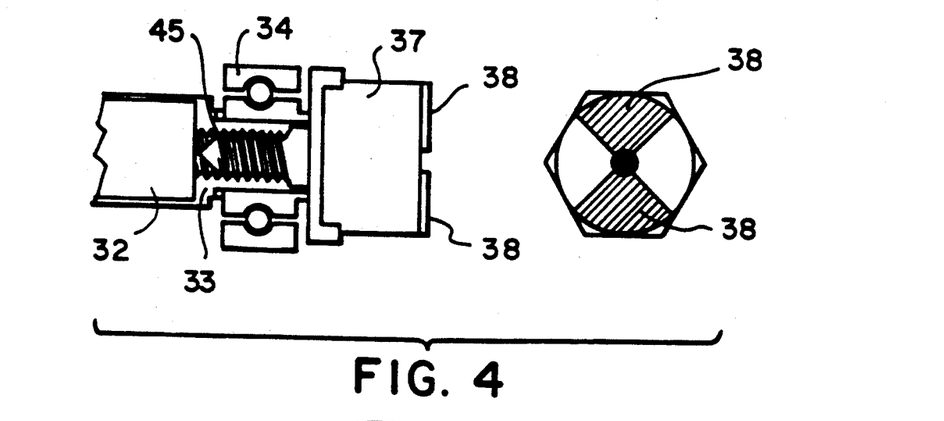
FIG. 4 is a view of a coupling between the rotor and the modulator.

FIG. 4 schematically shows in detail the central part of FIG. 3. Referring to FIG. 3, the permanent magnet rotor 32 is connected to the shaft 33 which is suspended by bearings 34. Attached to the shaft 33 is a screw 45 which is connected to the milky diffuser 37. The opaque surface 38 is mounted on the surface of the diffuser 37, which faces the lens 42, shown in FIG. 3.

Figure 1C:
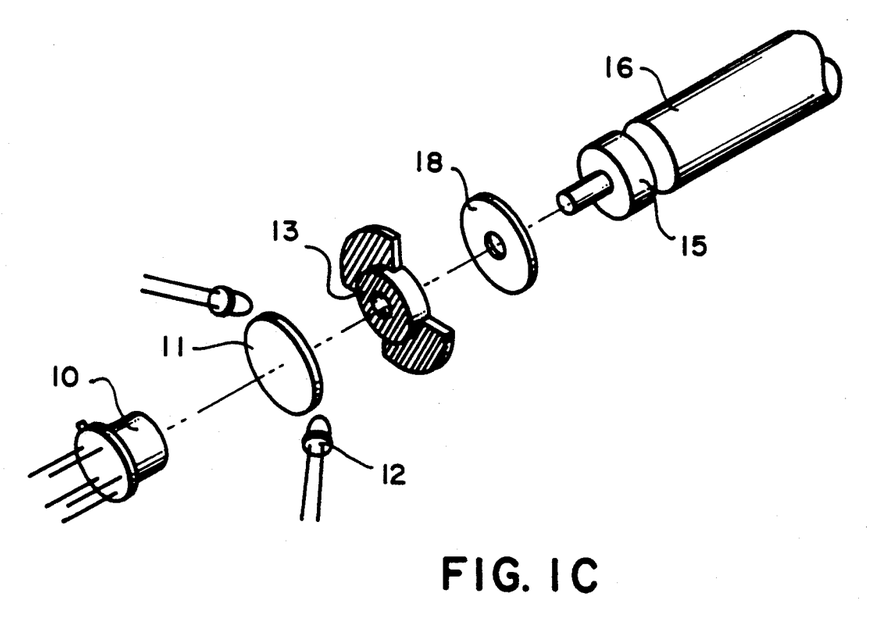
Figure 1D:
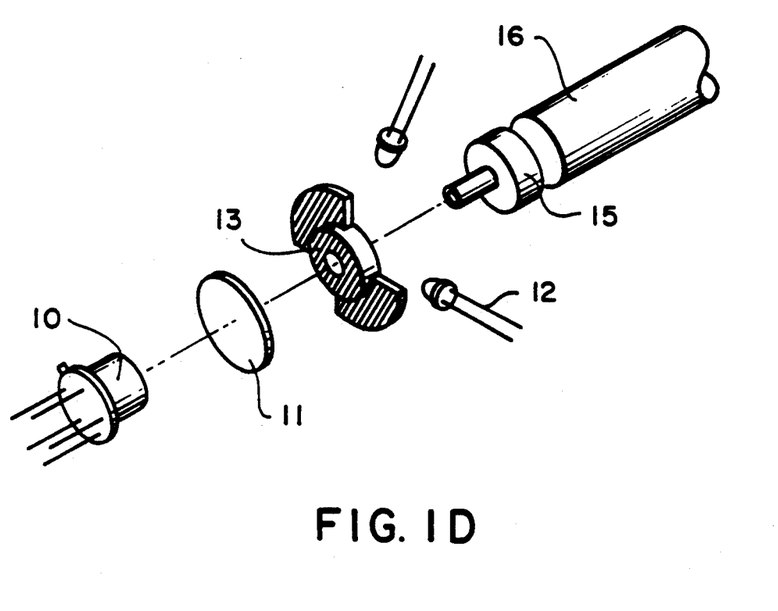
Figure 1E:
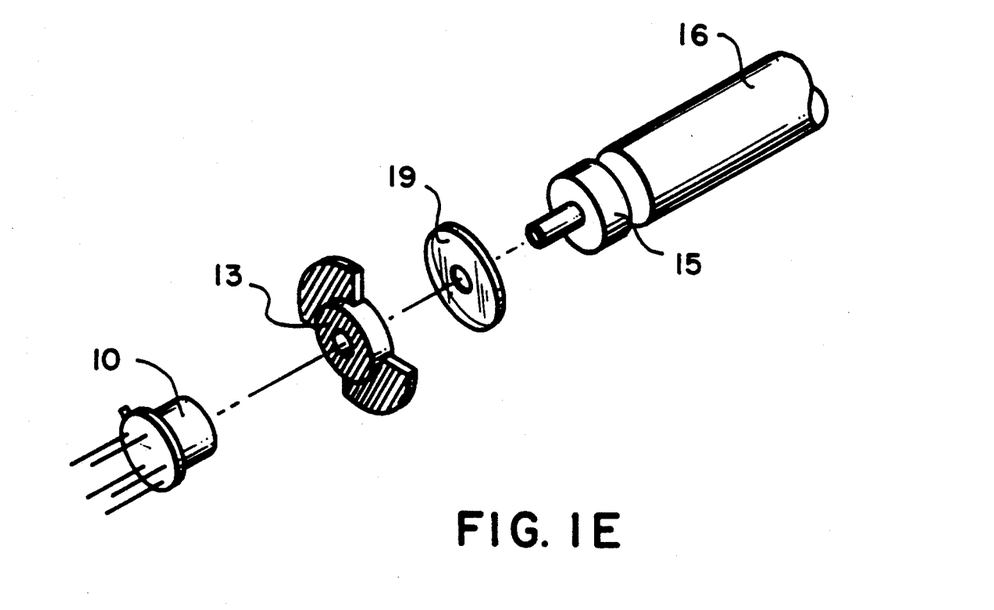
Figure 1F:
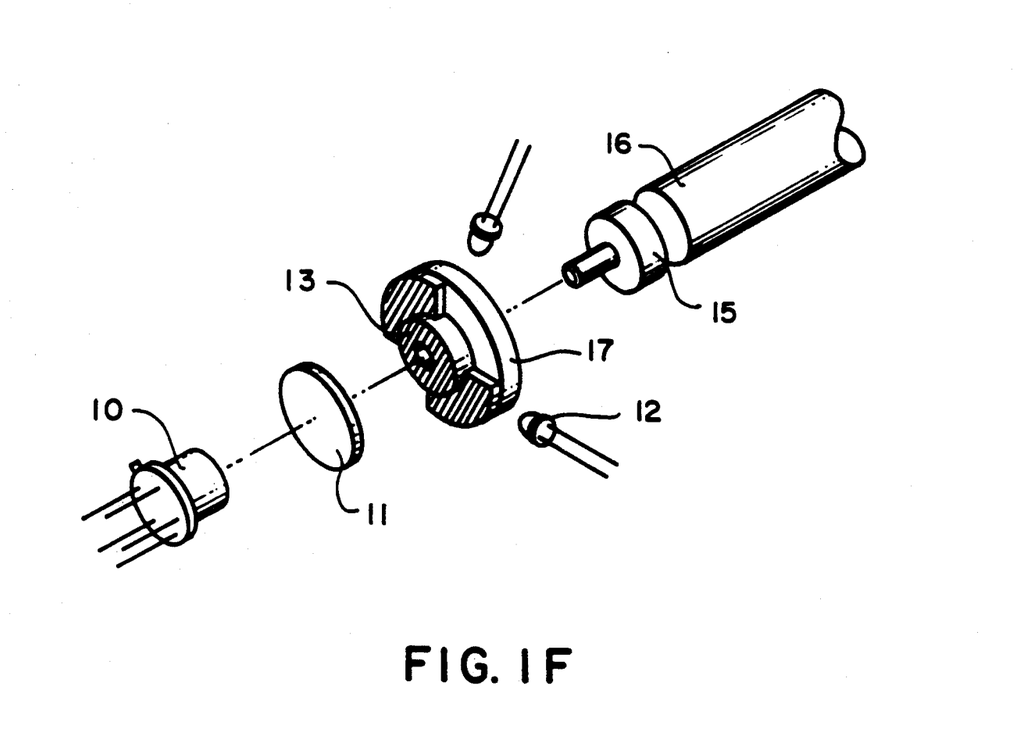

Referring to the embodiment of FIG. 1C, the rotating modulator in this case comprises a large diffusive reflector 18 and an opaque target 13 positioned in-between the source 12 and the diffusive reflector 19. In another embodiment, shown in FIG. 1D, the target 13, located between the radiation source and the detector, partially shields the source of light schematically shown by the two LEDs 12. FIG 1E schematically shows another embodiment wherein the source of radiation 19 is made of a phosphorescent or radioactive material. Radiation emitted from the surface 19 in modulated by the absorbing surface 13 and detected at the sensing surface of the detector 10. In another embodiment schematically shown in FIG. IF, optical radiation emitted from the source 12 is absorbed and then re-emitted by the diffuser 17 of the rotating modulator. This is the embodiment detailed in FIG. 3.

In a preferred embodiment the detector 10 is a quadrant cell detector, schematically shown in FIG. 2. This device has four discrete photodiodes located on a single substrate separated by a small gap ($\approx 100$ $\mu$m). The photodiodes share a common cathode contacted on the substrate and each diode's anode is contacted on its surface.

Figure 5:
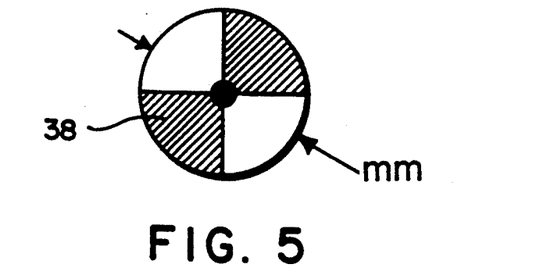
FIG. 5 is a view of the opaque target of the modulator.
Figure 6:
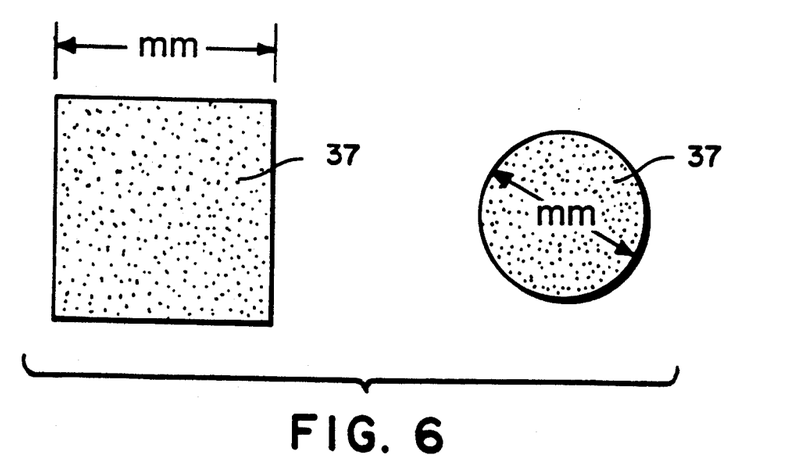
FIG. 6 is a view of the diffuser.

In the preferred embodiment the large diffusive reflector 37, shown in FIG. 6, has cylindrical shape with diameter 3 mm and height 4 mm and is made of milky nylon or teflon. Opaque target 38, shown in FIG. 5, is made by photolithography. The targets' thickness is 50 $\mu$m and the diameter of the central hub is also 50 $\mu$m. As shown is FIG. 4, this target is fixedly attached to the front surface of the diffusive reflector 37 facing the lens 42.

Figure 7:
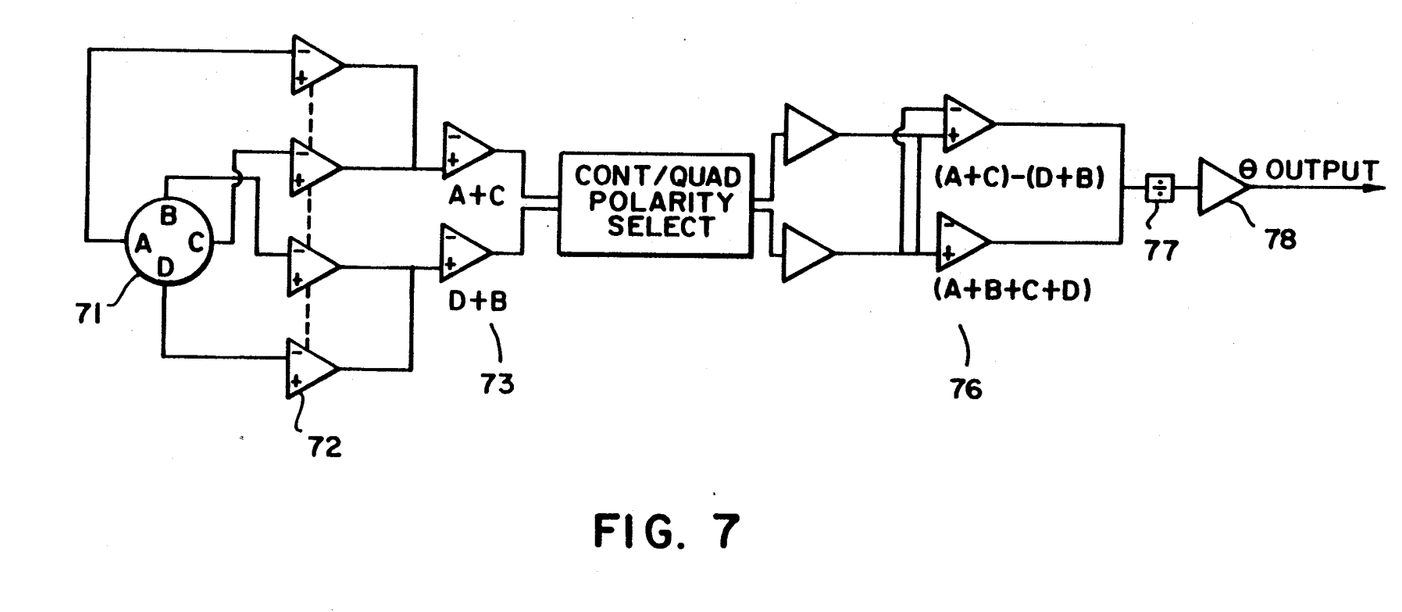
FIG. 7 is a schematic circuit diagram showing the detection arrangement of the four sensing sectors.

Referring to FIG. 7, the photocurrent generated by each diode is amplified and converted into voltage by the first amplifier stage 72 which operates in the transimpedance mode. The second stage 73 performs summing of the voltage signals of the axially opposite diodes 71. The signals are further amplified and added. The divider network 77 divides the difference signal by the sum signal to obtain the angular position function:

$$\Theta = \{(A+C) - (B+D)\}/(A+B+C+D)$$

wherein A, B, C, and D are voltages corresponding to the intensities of light detected at the first, second, third, and fourth photosensitive sector of the sensing surface 20 respectively. A final buffer amplifier 78 can be used before the analog angular position signal is displayed. Division by the sum of the photocurrents is performed to ratio out possible variations in the incident light level produced by the LEDs.

In another embodiment the sensing surface 20 has two sensitive sectors. The opaque surfaces of the modulator are shaped to vary the amount of light reaching each sector with the angular position of the modulator. Then the angular position function is.

$$\Theta = (A-B)/(A+B)$$

wherein A and B are voltages corresponding to the intensities of light detected at the first and second photosensitive sector of the detector. In general, the number of sensitive sectors can vary. The differential detection used in the present transducer can be utilized with two or more sensing surfaces symmetrically arranged about the axis of rotation. The opaque surfaces of the modulator and the sensing sectors of the detector must be arranged to vary the amount of light reaching each sector in direct dependence with the angular position of the rotor.

The necessary features of the optical transducer are high repeatability, high speed, low inertia, and low interference. Repeatability is the ability to place the shaft 33 and 29 at the given angle of orientation and to measure the signal provided by the detector then to move the shaft to a different angular position and then to return to the original angular position and observe the same voltage from the detector.

The relative configuration of the target 38 and the sensing surface 20 is designed to eliminate errors in the positional signal caused by non-rotational information such as non-rotational vibrations and microphonics. Frequently, these errors are inherent to the motor.

The shape of the opaque target 38 in relation to the sensing sectors 20 is such that the area of each interconnected pair of sensing sectors overlapped by the target 38 will remain constant even if the modulator or the sensing surface 20 translate in any direction other than that of rotation. Consequently, the detector 10 will not detect this motion and the non-rotational movement will not be reported as a change in rotation. Thus the electronics coupled to the detector 10 will not attempt to compensate for that motion. Therefore, no unnecessary compensations are created for non-rotational errors; this increases the repeatability of the transducer.

The speed of the optical transducer depends mainly on the response time of the quadrant cells detector which is 0.1 $\mu$sec for the silicon detector CD33H4D. It is essential to keep the sensor's inertia low. For this reason, the sensor has only three moving parts, screw 45, the diffuser 37, and the target 38. They add about 0.001 gm·cm$^2$ inertia load to the rotor 33. The interference of the optical transducer is inherently lower that for the variable-inductance or the variable-capacitance transducer.

Figure 8:
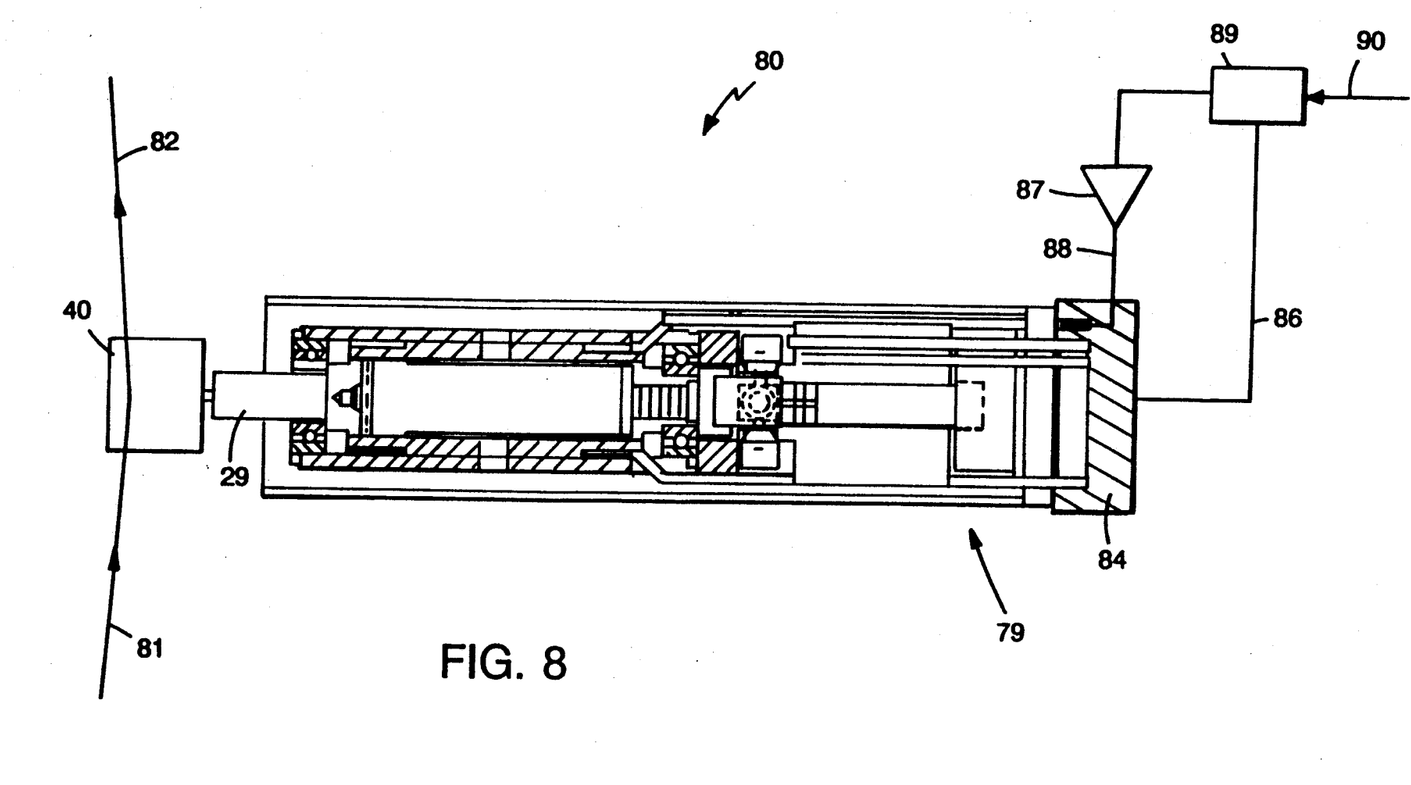
FIG. 8 is a schematic diagram showing the angular position transducer connected to a limited rotation motor of a laser scanning system.

Referring to FIG. 8, the limited rotation galvanometer 80 (also shown in FIG. 3) forms a part of a laser scanning system. The galvanometer 80 moves the mirror 40 located on the output shaft 29. A control system 89, connected in a closed-loop system, receives a feedback signal 86 from the angular position transducer 79 and sends a control signal 88 to the galvanometer via an amplifier 87. Furthermore, the control system 89 receives a position signal 90 which positions the mirror 40. The mirror 40 is used to deflect an incoming laser beam 81. A deflected laser beam 82 is used to modify material or objects in many applications.

What is claimed is:

1. A rotary motor having an angular position detector comprised of a driven member fixed to the rotor and a cooperating axially aligned stationary member, one of said members having a plurality of photosensitive sensing surfaces constructed to provide an angular position signal and the other comprising a radiation modulator with surface opposed to said sensing surfaces and constructed to overlap the sensing surfaces in amounts directly dependent upon the angular position of the rotor, said modulator constructed to control the amount of radiation energy that reaches said sensing surfaces in direct dependence with the relative angular position of said members and also constructed in a manner that relative translational displacements of said members do not alter appreciably said radiation energy that reaches said sensing surfaces, the amount of said energy detected by said sensing surface determining the value of said angular position signal.

2. The motor of claim 1 wherein the surface of said modulator comprises an opaque surface and a diffusive surface emitting radiation, said surfaces being shaped and constructed relative to said sensing surface so that the amount of radiation from said modulator reaching said sensing surface is varied in direct dependence with said angular position of said rotor.

3. The motor of claim 1 wherein said modulator is an illuminated diffusive surface being shaped and constructed relative to said sensing surface so that the amount of radiation from said diffusive surface reaching said sensing surface is varied in direct dependence with said angular position of said rotor.

4. The motor of claim 1, 2 or 3 wherein said sensing surface comprises at least two sensitive sectors and said surface of said modulator is shaped and constructed to inversely vary the amount of radiation reaching the respective sectors with change in angular position of said rotor, said sensitive sectors being connected to a detection circuit that produces said angular position signal.

5. The motor of claim 4 wherein said sensing surface comprises four sensitive sectors symmetrically constructed relative to an axis passing through the center of rotation of said rotor, and said surface of said modulator is formed symmetrically relative to said axis, said form of said modulator surface enabling radiation reaching axially opposite pairs of said sensitive sectors to be affected in the same manner with change in angular position of said rotor.

6. The motor of claim 1 including an optical source which illuminates a diffusive surface that forms part of said modulator.

7. The motor of claim 6 wherein said sensor surface is stationary and said modulator comprises a driven diffusive surface directed toward said sensing surface, and a stationary radiation source is constructed to illuminate said diffusive surface, said driven diffusive surface shaped to vary the amount of its radiation that reaches said sensing surface in direct dependence with said angular position of said rotor.

8. The motor of claim 7 wherein said stationary radiation source consists of one or more light emitting diodes.

9. The motor of claim 6 wherein said sensor surface is stationary, said modulator comprises a driven opaque surface that is positioned between said sensor surface and a diffusive surface, radiation from said diffusive surface travelling toward said sensing surface being modulated by said opaque surface, said driven opaque surface shaped to vary the amount of radiation that reaches said sensing surface in direct dependence with said angular position of said rotor.

10. The motor of claim 8 further comprising a lens for focusing said radiation onto said sensor surface.

11. The motor of claim 9 further comprising a lens for focusing said radiation onto said sensor surface.

12. The motor of claim 10 wherein said modulator comprises said diffusive surface which reflects radiation emitted from a radiation source.

13. The motor of claim 11 wherein said modulator comprises said diffusive surface which reflects radiation emitted from a radiation source.

14. The motor of claim 12 wherein said modulator comprises said opaque surface mounted on and rotating with said diffusive surface which reflects radiation emitted from a stationary radiation source.

15. The motor of claim 13 wherein said modulator comprises said opaque surface mounted on and rotating with said diffusive surface which reflects radiation emitted from a stationary radiation source.

16. The motor of claim 7, 8, 9, 14 or 15 wherein said sensing surface has two sensitive sectors, said sensitive sectors being connected to a detection circuit that produces said angular position signal by instantaneously evaluating the intensity of said radiation detected at said sectors using the formula $(A-B)/(A+B)$ wherein A is said intensity of radiation detected at the first sector and B is said intensity of radiation detected at the second sector.

17. The optical transducer of claim 6, 7, 8, 9, 14 or 15 wherein said sensing surface has four sensitive sectors, said sensitive sectors being connected to a detection circuit that produces said angular position signal by instantaneously evaluating the intensity of said radiation detected at said sectors using the formula $(A+C-B-D)/(A+B+C+D)$ wherein A, B, C, and D are the intensities of light detected at the first, second, third, and fourth sector of said sensor surface respectively.

18. The optical transducer of claim 6, 7, 8, 9, 14 or 15 wherein said sensing surface has four sensitive sectors, said sensitive sectors being connected to a detection circuit that produces said angular position signal by instantaneously evaluating the intensity of said radiation detected at said sectors using the formula $(A+C)-(B+D)$ wherein A, B, C, and D are the intensities of light detected at the first, second, third, and fourth sector of said sensor surface respectively.

19. Angular position transducer of a limited rotation motor comprising
a cooperating fixed member having a photosensitive surface divided into four sensing sectors for detecting optical radiation,
a rotating modulating member having diffusively emitting and opaque surfaces, and also having opaque central surface region, said rotating modulating member being fixedly attached to the rotor of said motor,
an optical source for generating radiation to irradiate said diffusively emitting surface of said modulating member, said members cooperatively constructed to provide a relative angular position signal depending on the amount of energy transferred between said emitting surface of said rotating member and said photosensitive surface of said fixed member, and a detection circuit connected to said four sensing sectors, said detection circuit produces said angular position signal by instantaneously evaluating the intensity of said radiation detected at said sectors using the formula $(A+C-B-D)/(A+B+C+D)$ wherein A, B, C, and D are the intensities of light detected at the first, second, third, and fourth sector of said photosensitive surface, respectively.

20. Angular position transducer of a limited rotation motor comprising a cooperating fixed member having a photosensitive surface divided into four sensing sectors for detecting optical radiation, a rotating modulating member being fixedly attached to the rotor of said motor and having diffusively emitting and opaque modulating sectors, the number of said sensing sectors being equal to the number of said modulating sectors, an optical source for generating radiation to irradiate said diffusively emitting surface of said modulating member, said members cooperatively constructed to provide a relative angular position signal depending on the amount of energy transferred between said emitting surface of said rotating member and said photosensitive surface of said fixed member, said members also constructed in a manner that relative translational displacements of said members do not alter appreciably said transferred energy, and a detection circuit connected to said four sensing sectors, said detection circuit produces said angular position signal by instantaneously evaluating the intensity of said radiation detected at said sectors using the formula $(A+C-B-D)/(A+B+C+D)$ wherein A, B, C, and D are the intensities of light detected at the first, second, third, and fourth sector of said photosensitive surface, respectively.

21. Angular position transducer of claim 19 or 20 wherein said opaque sectors form a butterfly shape with diametrically opposed segments symmetrically constructed about the axis of rotation of the rotor.

22. A laser scanning system having the motor of claim 1, 19 or 20 wherein said motor is a limited rotation galvanometer, the rotor of said motor connected to oscillate a mirror for deflecting a laser beam, and said angular position detector connected in a manner to maintain the accuracy of displacement of the rotor of said motor.

* * * * *